United States Patent [19]

McCoy et al.

[11] Patent Number: 4,524,023

[45] Date of Patent: Jun. 18, 1985

[54] BICYCLODECYL ETHER SULFONATES AND COMPOSITIONS CONTAINING THE SAME

[75] Inventors: David R. McCoy; Carter G. Naylor, both of Austin, Tex.

[73] Assignee: Texaco Inc., White Plains, N.Y.

[21] Appl. No.: 548,539

[22] Filed: Nov. 3, 1983

[51] Int. Cl.³ .................. C11D 1/22; C11D 1/831
[52] U.S. Cl. ..................... 252/548; 252/8.55 D; 252/549; 252/550; 252/551; 252/554; 252/555; 252/558; 252/559; 252/DIG. 14; 260/503
[58] Field of Search ....... 252/549, 558, 559, DIG. 14, 252/548, 8.55 D; 260/503

[56] References Cited

U.S. PATENT DOCUMENTS

| | | | |
|---|---|---|---|
| 3,370,080 | 2/1968 | Bloch | 260/457 |
| 4,426,302 | 1/1984 | McCoy et al. | 252/8.55 D |
| 4,454,074 | 6/1984 | Naylor | 260/503 |

FOREIGN PATENT DOCUMENTS 152860 9/1983 Japan.
2119369 11/1983 United Kingdom.

*Primary Examiner*—Prince E. Willis
*Attorney, Agent, or Firm*—Jack H. Park; Kenneth R. Priem; Richard A. Morgan

[57] ABSTRACT

This invention discloses a family of bicyclodecyl ether sulfonates derived from dicyclopentadiene. Specifically synthesized is the compound:

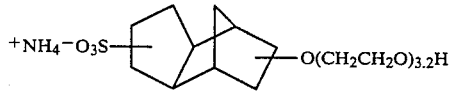

These compounds exhibit hydrotropic properties.

These compounds are useful in liquid detergent formulations used in household, industrial and institutional products.

7 Claims, No Drawings

BICYCLODECYL ETHER SULFONATES AND COMPOSITIONS CONTAINING THE SAME

BACKGROUND OF THE INVENTION

1. Field of the Invention

This invention relates to a family of bicyclodecyl ether sulfonates which exhibit hydrotropic properties. This invention also relates to liquid detergent formulations.

2. Description of the Prior Art

The preparation of mono ethers of dicyclopentadiene by the addition reaction of a glycol and dicyclopentadiene in the presence of a strong acid catalyst is known in the art. U.S. Pat. No. 4,140,724 describes a process which is selective for preparing mono ether products of the formula:

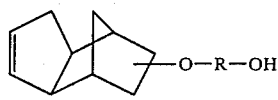

wherein R is a divalent radical of 2 to 20 carbon atoms.

Sulfonated polyethers of dicyclopentadiene are also known. U.S. Pat. No. 4,426,302, McCoy et al., describes a compound of the formula:

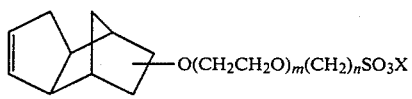

wherein m is an integer of from 1 to 10, n is an integer of from 2 to 3 and X is sodium, potassium or ammonium.

Hydrotropes are chemical compounds which are used in liquid detergent formulations to increase the aqueous solubility of slightly soluble substituents in the formulation. Hydrotropes lower the viscosity and gelling tendency of concentrated liquid detergent blends and improve their stability. They can also enhance the effectiveness of the surfactants in the formulation. The most widely used hydrotrope is sodium xylene sulfonate.

SUMMARY OF THE INVENTION

The bicyclodecyl ether sulfonate compound of the present invention can be generically represented by the formula:

wherein AO is an alkyleneoxy selected from the group consisting of ethyleneoxy, propyleneoxy and mixtures thereof, n is an integer of from 0 to 20, and M is a cation selected from the group consisting of ammonium, sodium, potassium, calcium and magnesium and m is 1 or 2.

These compounds demonstrate hydrotropic properties rather than surface activity demonstrated by some structurally similar compounds. These hydrotopes are useful in liquid detergent formulations. The invention also relates to such liquid detergent formulations.

DESCRIPTION OF THE PREFERRED EMBODIMENTS

The present invention is a bicyclodecyl ether sulfonate compound of the formula:

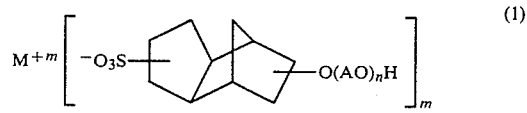

(1)

wherein AO is an alkyleneoxy selected from the group consisting of ethyleneoxy, propyleneoxy and mixtures thereof, n is an integer of from 0 to 20, preferably 1 to 6, most preferably 2 to 5; and M is a cation selected from the group consisting of ammonium, sodium, potassium, calcium and magnesium; and m is 1 or 2.

Compounds of the present invention may be prepared according to a three-step synthesis.

A. Preparation of the Mono Ether

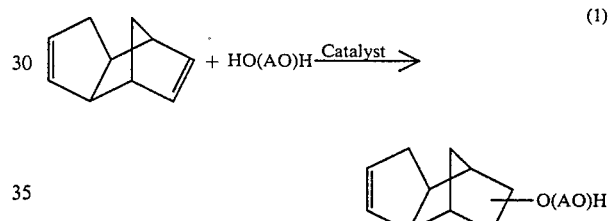

(1)

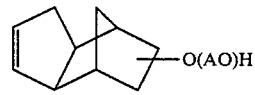

This synthesis step is fully described in U.S. Pat. No. 4,140,724 incorporated herein by reference.

The mono ether is synthesized in yields of typically 70 to 90 percent of the mono ether. A 70 percent yield is typical when AO contains three carbon atoms, whereas 90 percent is achievable when AO contains two carbon atoms.

Ethylene glycol, 1,2-propylene glycol or 1,3-propanediol are reacted in excess over preferably an acid cation exchange resin catalyst, for example AMBERLYST® 15. Conventional, strong acid catalysts may also be used such as sulfuric acid, or a Lewis acid such as boron trifluoride.

Temperatures of 110° C. to 130° C. are typical with pressure sufficient to maintain components in the liquid phase. Generally, heating at the specified temperature for 3 hours will achieve the stated yields.

The reaction mixture is filtered, neutralized and then vacuum-distilled at 20 mm Hg to remove the reactant. The residual mixture is then vacuum distilled at 6 mm Hg to recover the mono ether product.

B. Alkoxylation

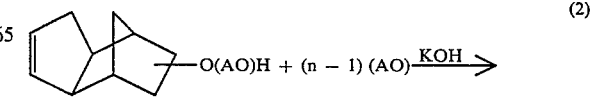

(2)

The mono ether is then alkoxylated using methods well known in the art. For example, a solution comprising about 60 to 100 weight percent of the mono ether is charged to an autoclave under inert atmosphere. Then 0.5 weight percent or more powdered potassium hydroxide or sodium hydroxide and optionally a suitable solvent such as toluene or xylene is charged to the autoclave, and the contents are heated to a temperature of about 120° C. to remove water followed by addition of the required weight of ethylene oxide, propylene oxide or mixture thereof pressured with nitrogen into the autoclave over a period of 1 to 3 hours. Following cooling, the remaining reaction product is stripped to remove volatile materials, yielding the alkoxylated ether.

C. Sulfonation

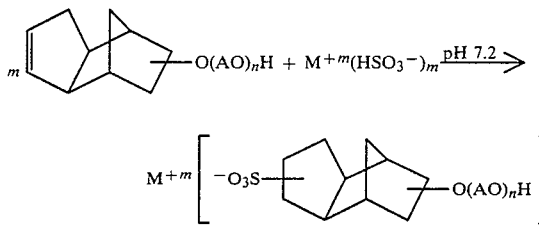

The alkoxylated product is then sulfonated. The reaction mixture is buffered with a sulfite-bisulfite solution in a pH range of broadly pH 6.5 to 8.5. In practice, a pH 7.2±0.2 yields most acceptable results with yields falling off rapidly outside the range. Additional bisulfite is added at elevated temperatures in the presence of air at such a rate as to maintain the pH.

It has been found that the most satisfactory yields are achieved in synthesizing the ammonium salt.

D. Alternative Synthesis - for n=0

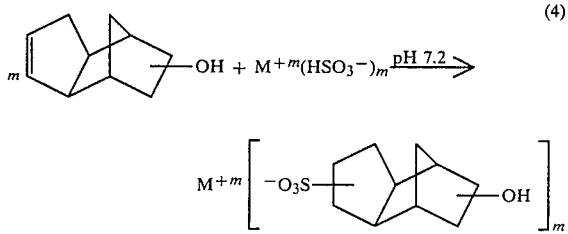

Dicyclopentenyl alcohol is directly sulfonated using reaction conditions described for the alkoxylated product.

Synthesis of the compounds of the present invention is more fully described in the Examples.

The invention is also a concentrated homogeneous liquid detergent composition comprising:
(a) about 25 wt % to about 50 wt % of a surface active agent comprising:
(i) an anionic surfactant and (ii) a nonionic surfactant wherein the weight ratio of anionic:nonionic is 0:1 to 2:1;
(b) about 0 wt % to about 10 wt %, preferably 1 wt % to 5 wt %, of a solvent selected from the group consisting of ethanol, isopropanol and mixtures thereof;
(c) a bicyclodecyl ether sulfonate hydrotrope of the formula:

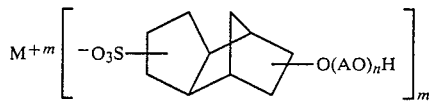

wherein AO is an alkyleneoxy selected from the group consisting of ethyleneoxy, propyleneoxy and mixtures thereof;

n is an integer of from 0 to 20; and

M is a cation selected from the group consisting of ammonium, sodium, potassium, calcium and magnesium; and m is 1 or 2;

wherein the hydrotrope is in an amount sufficient to give the liquid detergent a kinematic viscosity of from 100 to 250 cps @ 25° C.; and
(d) water.

The anionic surfactant chosen is not critical and may be any of the known anionic surfactants used and is chosen on the basis of effectiveness and economy. These anionic surfactants include any of the known hydrophobes attached to a carboxylate, sulfonate, sulfate or phosphate polar, solubilizing group including salts. Salts may be the sodium, potassium, calcium, magnesium, barium, iron, ammonium and amine salts.

Suitable hydrophobes are 10 to 18 carbon number alkyls, particularly linear and essentially linear alkyls. Additionally, alkylaryls, ethoxylated alkyls, alkylpolyethoxyalkylenes, alkyarylpolyethoxyalkenes and alkylenes of 10 to 18, preferably 12 to 15 carbon atoms are suitable hydrophobes.

A preferred class of anionic surfactants is the sulfates and sulfonates such as alkyl sulfates, alkyl sulfonates, ethoxylated alkyl or alkylarylsulfates, alkylarylsulfonates, alkylarylpolyethoxy alkylenesulfonates, olefin sulfonates and petroleum sulfonates.

A short list of examples of alkylaryl sulfonates is dodecylbenzene sulfonate, undecylbenzene sulfonate, tridecylbenzene sulfonate, nonylbenzene sulfonate, the sodium, potassium, ammonium, triethanolammonium and isopropylammonium salts thereof.

The various materials available under the general name of petroleum sulfonates vary in composition according to the petroleum fraction used for sulfonation and in the degree of sulfonation imparted to the petroleum fraction. Preferable petroleum sulfonates are those prepared from a petroleum fraction whose boiling range is from 700° F. to 1100° F. which corresponds to a molecular weight range of from about 350 to about 500. The sodium salt of the sulfonated product of this petroleum fraction is an excellent material for use in the present invention. The potassium and ammonium salts are also useful.

Mixtures of petroleum sulfonates can also be employed. For example, a mixture of predominantly water soluble petroleum sulfonate having an average equivalent weight of less than 400 and preferably less than 350 may be utilized along with a second petroleum sulfonate which is at least partially oil soluble and having an average equivalent weight of about 400 to about 600 and preferably about 450 to about 550.

The nonionic surfactant chosen is not critical and may be any of the known surfactants compatible with the anionic surfactant chosen. These are preferably the 10 to 18, preferably 12 to 15 carbon number nonionic surfactants. These include alcohol alkoxylates, alkylphenol alkoxylates, carboxylic acid esters, polyoxyalkylene esters, particularly the ethoxy, propoxy and ethoxy-propoxy adducts thereof. Examples include but are not limited to alcohol ethoxylates; i.e. ethoxylated aliphatic alcohols, alkylphenols; i.e. ethoxylated alkyl phenols such as the 8.5 molar ethoxylate of nonylphenol.

The anionic-nonionic surfactant pair is selected on the basis of compatibility and the application. The method for determining the optimum surfactant concentration is found in U.S. Pat. No. 4,066,124 which is incorporated herein in its entirety by reference. The ratio of nonionic:anionic surfactant ranges from 100:1 to 1:100 with nonionic surfactant of greater than half being preferred. Total anionic and nonionic surfactant is preferably 10 wt. % to 60 wt. %, most preferably 20 wt. % to 50 wt. %.

It has been found that the only satisfactory method for determining the proper contributions of hydrotrope and solvent involves actually preparing a series of solutions containing the materials in various concentrations and determining the ratio of solvent to hydrotrope which produces the desired properties of viscosity and cloud point.

As a starting point, at least 3 and preferably 5 different solvent-hydrotrope samples should be prepared for each anionic-nonionic surfactant blend and concentration. Solvent is added to each sample in an amount such that series of samples spans the range of from 1 wt. % to 5 wt. % of solvent. If this starting procedure is not successful, it may be necessary to rerun to cover the range of 0 wt. % to 10 wt. % solvent. Then an aliquot of hydrotrope is added to each sample, in an amount that is determined by experience. As a first try, with no other information available, 2 wt. % of hydrotrope may be tried.

The most desirable goal based on economic and safety considerations, would be to have no solvent and all hydrotrope to achieve kinematic viscosity of 100 to 250 cps @ 25° C. However, typically, some solvent must be added to achieve this viscosity range with a clear point, the temperature above which the solution remains clear, of 10° C. or lower.

The final composition is compounded by methods well known in the art.

The concentrated composition is typically shipped to point of use and then further diluted with water and if desired, cleaning adjuvants. Desired dilution for end use strength is typically 0.1 vol % concentrated formulation in water. This concentration gives rise to a preferred actual range of about 0.05 vol % to about 0.5 vol %.

In this end use strength, the invention is:

a dilute liquid detergent composition comprising:

A. about 0.01 vol % to about 50 vol % of a concentrated liquid detergent formulation comprising:

(a) about 25 wt % to about 50 wt % of a surface active agent comprising:

(i) an anionic surfactant and (ii) a nonionic surfactant wherein the weight ratio of anionic:nonionic is 0:1 to 2:1;

(b) 0 wt % to about 10 wt % of a solvent selected from the group consisting of ethanol, isopropanol and mixtures thereof:

(c) a bicyclodecyl ether sulfonate hydrotrope of the formula:

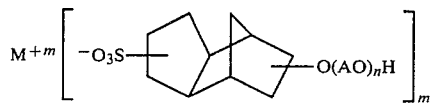

wherein AO is an alkyleneoxy selected from the group consisting of ethyleneoxy, propyleneoxy and mixtures thereof:

n is an integer averaging from 0 to 20; and

M is a cation selected from the group consisting of ammonium, sodium, potassium, calcium and magnesium, and m is 1 or 2 wherein the hydrotrope is an amount sufficient to give the liquid detergent a kinematic viscosity of from 100 to 250 cps @ 25° C., and B. water.

The dilute liquid detergent is most conveniently made by first compounding the concentrated composition and then diluting it with water. The kinematic viscosity testing hereinbefore described yields a solvent concentration of about 1 wt % to about 10 wt %; preferably 2 wt % to 6 wt % based on the concentrate, proportionately reduced in the dilute composition. This testing also yields a hydrotrope concentration of 1 wt % to 6 wt % based on the concentrate, proportionately reduced in the dilute composition.

The weight percents of anionic and nonionic surfactant correspond to weight ratios of 0:1 to 2:1 anionic:nonionic in the concentrate, proportionately reduced in the dilute composition. These guidelines may be used to formulate the dilute composition directly. However, it is anticipated that best and most economic result will be achieved by the formulation of the concentrate and dilution to 0.1 vol % with water and optionally cleaning adjuvants. The following classes of materials are generically referred to as detergent adjuvants:

1. Inorganic salts, acids and bases. These are usually referred to as "builders". These salts usually comprise carbonates, hydroxides, phosphates and silicates of the alkali metals as well as their neutral soluble salts. These materials may constitute up to about 99 weight percent of the composition in which they are employed.

2. Organic builders or additives—These are substances which contribute to characteristics such as detergency, foaming power, emulsifying power or soil-suspending effect. Typical organic builders include sodium carboxymethyl cellulose, sequestering agents such as ethylenediaminetetraacetic acid and the fatty monoethanolamides, etc.

3. Special purpose additives—These include solubilizing additives such as lower alcohols, glycols and glycol ethers, bleaches or brighteners of various structures which share in common that they are dyestuffs and they do not absorb or reflect light in the visible range of the spectrum.

This invention concerns an improved surfactant water flooding petroleum recovery process suitable for use in high salinity formations, e.g., formations containing water or brine whose salinity is from 20,000 to 240,000 parts per million total dissolved solids, which formation brines frequently also contain high concentration of divalent ions such as calcium and magnesium in the range from 1,000 to 20,000 parts per million. The surfactant fluid is ordinarily compounded to have about the same salinity as the formation water, usually in the range from 50% to 100% and preferably from 75% to 100% of the salinity of the water present in the formation. In one embodiment, the present invention relates to:

A process for recovering petroleum from a subterranean petroleum-bearing formation penetrated by an injection well and a production well which comprises:

(A) injecting into the formation via the injection well a drive fluid comprising water dissolved therein an effective amount of liquid detergent composition comprising:

(a) about 25 wt. % to about 50 wt. % of a surface active agent comprising;

(i) an anionic surfactant and (ii) an nonionic surfactant wherein the weight ratio of anionic:nonionic is 0:1 to 2:1;

(b) about 0 wt. % to about 10 wt. %; preferably 1 wt. % to 5 wt. %, of a solvent selected from the group consisting of ethanol, isopropanol and mixtures thereof;

(c) a bicyclodecyl ether sulfonate hydrotrope of the formula:

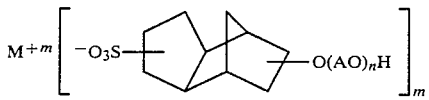

wherein AO is an alkyleneoxy selected from the group consisting of ethyleneoxy, propyleneoxy and mixture thereof;

n is an integer averaging from 0 to 20, preferably 3 to 5;

M is a cation selected from the group consisting of ammonium, sodium, potassium, calcium and magnesium, and m is 1 or 2;

wherein the hydrotrope is an amount sufficient to give the liquid detergent a kinematic viscosity of from 100 to 250 cps @ 25° C.;

(B) forcing the fluid through the formation; and (C) recovering petroleum through the production well.

The concentration of an effective amount of the surfactant of the process of the present invention in aqueous fluid will vary depending on the distribution of homologues formed as well as the water salinity and hardness and the temperature to be encountered in the formation. It is preferred that the optimum response at various concentrations be measured under conditions simulating those which will be present in the formation and the concentration which corresponds to the optimum surfactant performance characteristics be identified in this matter. In actual field use, the concentration of surfactant used will be considerably greater than the optimum value determined from the capillary displacement value in order to compensate for surfactant adsorbed by the formation. Generally the concentration of anionic surfactant will be from about 0.05 to about 5.0 percent and preferably from about 0.1 to about 2.0 percent by weight.

The volume of surfactant solution to be utilized in the process of this invention can vary from about 2 to about 75 pore volume percent and is preferably from about 10 to about 50 pore volume percent. It is, of course, desirable from an economic standpoint to use as small an amount of surfactant as possible to attain the necessary performance.

Ordinarily, the petroleum formation will have been subjected to conventional water flooding before the application of the surfactant solution of this invention; although this is not a requirement for the application of the surfactant process of this invention. Water flooding is generally undertaken if it will result in the recovery of a reasonable quantity of oil above that required by primary means since it is much less costly than surfactant flooding or other means of enhanced recovery. If the surfactant flooding process is to be applied to a formation which has already been water flooded, the water sample tested should be that existing in the formation after water flooding since the concentration of salt as well as water soluble salts of divalent cations such as calcium or magnesium may be changed as a consequence of injection water differing from the original formation water. As a corollary to this, the formation temperature after water flooding should be ascertained since it may have been altered as a consequence of the water flooding process. Preflushing with a sacrificial agent, e.g., inorganic phosphate, may be useful to minimize adsorption losses of the surfactant on the formation matrix.

It is also a common practice to follow the surfactant solution with an aqueous fluid which contains little or no surfactant but which has dissolved in it a substance which increases viscosity of the water so as to attain a favorable mobility ratio between that fluid and the previously injected surfactant solution. Hydrophilic polymers such as sodium polyacrylamide or polysaccharides are commonly utilized for this purpose. The type and quantity of viscosity increasing polymer injected subsequent to the surfactant solution can generally be the same as in regularly used for such purposes in convention surfactant flooding. Generally from about 5 to about 50 pore volume percent of an aqueous solution containing from about 100 to about 800 parts per million of the hydrophilic polymer is used. This is followed by water injection which is continued until the water-oil ratio of the fluid being recovered from the formation increases to a point where further injection of water is uneconomical. It is, of course, also acceptable to increase the viscosity of the surfactant fluid by incorporation of a similar polymer.

This invention is better shown by way of example.

EXAMPLE 1

A. Dicyclopentenyl β-hydroxyethyl ether

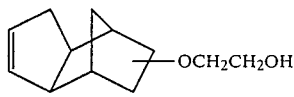

was prepared by addition of ethylene glycol to dicyclopentadiene in the presence of a Lewis acid.

B. Two hundred grams of the above compound were charged to a one-liter autoclave with 1 g potassium hydroxide. The mixture was nitrogen purged at 120° C. with mechanical stirring to remove water. The autoclave was sealed and charged with 99 g ethylene oxide slowly at 120° C. followed by 1 hour digestion period.

The product was identified by hydroxyl number analysis as

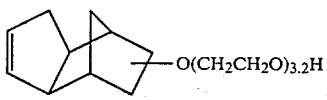

C. A round bottom flask equipped with mechanical stirrer, thermometer, pH meter, and air inlet was charged with 50 g of the above ethoxylate, 100 g H$_2$O, 2 g conc. ammonium hydroxide solution and 130 g isopropyl alcohol. The contents were stirred at 55° C. with 10 ml/min air introduced through a fritted glass disk. 45% aqueous ammonium bisulfite solution was added dropwise over 8½ hours at such a rate so as to maintain a solution pH of 7.2.

The reaction mixture was treated with 50 ml isopropyl alcohol, bottom layer discarded, and top layer stripped to remove all isopropyl alcohol. The resulting aqueous solution was diluted with 50 ml H$_2$O and extracted twice with 100 ml ethyl acetate to recover a total of 10 g unreacted starting material. The aqueous layer was stripped to remove traces of ethyl acetate, leaving 135 g of clear solution containing (by sulfonate analysis) 25.3 wt. % desired

This solution showed no detectable presence of detergent range sulfonates by two phase titration with a quaternary ammonium salt. Surfactant properties are shown below:

|  | 0.1% soln. | 1.0% soln. |
|---|---|---|
| Interfacial Tension, dynes/cm | 30 | 25.3 |
| Surface Tension, dynes/cm | 65.5 | 61.4 |

Properties of the compound are shown in Example 5.

EXAMPLE 2

Using the general reaction conditions of Example 1(C) above, 131 g ammonium bisulfite solution was added to 5 g dicyclopentenyl alcohol

(Velsicol Chemical Co.) in 90 g H$_2$O: 130 g isopropyl alcohol. Workup as in Example 1 yielded 147 g of solution containing 30.8% desired sulfonate. Surface and interfacial tension values show that the product is very weakly surface active:

|  | 0.1% soln. | 1.0% soln. |
|---|---|---|
| Interfacial Tension, dynes/cm | 36.6 | 26.6 |
| Surface Tension, dynes/cm | 66.8 | 54.7 |

EXAMPLE 3

1. A one-liter autoclave was charged with 200 g of the product of Example 1(B) and 120 g propylene oxide added at 130° C. After digestion, hydroxy number analysis showed that 2.3 moles propylene oxide had been added.

2. To 50 g of the above propoxylate in 90 g H$_2$O and 130 g isopropyl alcohol under reaction conditions of Example 1(C) was added 36 g ammonium bisulfite solution and reaction mixture was treated as previously described to remove unreacted propoxylate and solvents. The aqueous solution analyzed for 26 wt. % desired sulfonate.

Properties of the compound are shown in Example 5.

EXAMPLE 4

To 62 g of the DCPD-EG adduct described in Example 1(A) were added over 6½ hours 95 g of 45% ammonium bisulfite solution using the method of Example 1(C). The reaction mixture was treated as before to obtain an aqueous solution containing 28 wt. % desired sulfonate.

EXAMPLE 5

Three liquid formulations (A, B, C) containing 30%, 40% and 50% total surfactant respectively were prepared using SURFONIC ® HDL (a 6:1 blend of SURFONIC ® N-85, the 8.5 molar ethoxylate of nonylphenol, and triethanolamine) and dodecylbenzene sulfonate (C$_{12}$LAS, WITCONATE ® 1238). The products described in the above Examples were compared with sodium xylene sulfonate (SXS). Hydrotrope concentration was 2% plus 4% ethanol. A blank containing ethanol only was prepared for each formulation. Table I summarizes viscosity and clear point (temperature at which cloudy formulations become clear on warming) data.

The first series, formulation A, establishes the hydrotropic behavior of the subject compositions—viscosity values are about half those of the blank. SXS is the most effective at reducing viscosity.

Formulations B and C both show advantages of the new compositions over SXS. In Formulation B, all four samples have lower viscosities than SXS, and two show the same minimum clear point (< −10°). In Formulation C all four likewise have lower viscosities than SXS, and one (Ex. 3) has a lower clear point as well.

The superior performance of Ex. 3 illustrates the influence of the polyether chain on formulation properties; the chain can be designed to provide optimum properties for any given application.

TABLE I

| | | | | TEST RESULTS | | | |
|---|---|---|---|---|---|---|---|
| Formulation | Weight % SURFONIC ® HDL | Wt % C$_{12}$LAS | Wt % Ethanol | Hydrotrope | Clear Point, °C. | Kinematic cs @ 25° C. | Viscosity cs @ 15.6° C. |
| A | 25 | 5 | 4 | Example 2 | <−10 | 179 | 435 |
| | | | | Example 4 | <−10 | 160 | 391 |
| | | | | Example 1 | <−10 | 168 | 435 |
| | | | | Example 3 | <−10 | 146 | 369 |

TABLE I-continued

| Formulation | Weight % SURFONIC ® HDL | Wt % C₁₂LAS | Wt % Ethanol | Hydrotrope | Clear Point, °C. | Kinematic cs @ 25° C. | Viscosity cs @ 15.6° C. |
|---|---|---|---|---|---|---|---|
| | | | | SXS | <−10 | 131 | 266 |
| | | | | None | <−10 | 308 | 740 |
| B | 30 | 10 | 4 | Example 2 | −10 to 0 | 186 | 390 |
| | | | | Example 4 | −10 to 0 | 171 | 366 |
| | | | | Example 1 | <−10 | 193 | 413 |
| | | | | Example 3 | <−10 | 181 | 391 |
| | | | | SXS | <−10 | 234 | 491 |
| | | | | None | −10 to 0 | 326 | 700 |
| C | 35 | 15 | 4 | Example 2 | 11 | 177 | 365 |
| | | | | Example 4 | 8 | 165 | 335 |
| | | | | Example 1 | 8 | 182 | 367 |
| | | | | Example 3 | −10 to 0 | 176 | 356 |
| | | | | SXS | 2 | 197 | 389 |
| | | | | None | 12 | 250 | 507 |

EXAMPLE 6

In a field in which the primary production has already been exhausted, an injection well is completed in the hydrocarbon-bearing formation and perforations are formed between the interval of 6890–6910 feet. A production well is drilled approximately 415 feet distance from the injection well, and perforations are similarly made in the same hydrocarbon-bearing formation at 6895–6915 feet.

The hydrocarbon-bearing formation in both the injection well and the production well is hydraulically fractured using conventional techniques, and a gravel-sand mixture is injected into the fracture to hold it open and prevent healing of the fracture.

In the next step, oil field brine of 1000 ppm hardness at a temperature of 75° F. containing dissolved therein 1% by weight petroleum sulfonate and 0.5% by weight of the product of Example 1 is injected via the injection well into the formation at a pressure of about 1300 psig and at the rate of 1.05 barrels per minute. Injection of the driving fluid continues at the rate of 1.05 barrels per minute and at the end of 67 days, a substantial production of petroleum is achieved.

The principle of the invention and the best mode contemplated for applying that principle have been described. It is to be understood that the foregoing is illustrative only and that other means and techniques can be employed without departing from the true scope of the invention defined in the following claims.

What is claimed is:

1. A highly concentrated homogeneous liquid detergent composition comprising:
(a) about 25 wt. % to about 50 wt. % of a surface active agent comprising:
 (i) an anionic surfactant and
 (ii) a nonionic surfactant wherein the weight ratio of anionic:nonionic is 0:1 to 2:1;
(b) 0 wt. % to about 10 wt. % of a solvent selected from the group consisting of ethanol, isopropanol and mixtures thereof;
(c) a bicyclodecyl ether sulfonate hydrotrope of the formula:

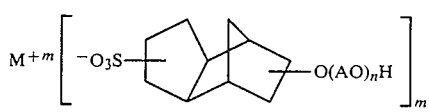

wherein
AO is an alkyleneoxy selected from the group consisting of ethyleneoxy, propyleneoxy and mixtures thereof;
n is an integer averaging from 0 to 20; and
M is a cation selected from the group consisting of ammonium, sodium, potassium, calcium and magnesium; and
m is 1 or 2; and
wherein the hydrotrope is an amount sufficient to give the liquid detergent a kinematic viscosity of from 100 to 250 cps @ 25° C., and
(d) water.

2. The composition of claim 1 wherein the surface active agent comprises 25 wt. % to 35 wt. %.

3. The composition of claim 1 wherein the solvent is from 1 wt. % to 5 wt. %.

4. The composition of claim 1 wherein the surface active agent comprises:
(i) from 5 wt. % to 15 wt. % of the anionic surfactant dodecylbenzene sulfonate, and
(ii) from 25 wt. % to 35 wt. % of a nonionic surfactant which is a 2:1 to 8:1 (wt:wt) mixture of the 8.5 molar ethoxylate of nonylphenol and triethanolamine.

5. The composition of claim 1 wherein n is an integer of from 3 to 5.

6. The composition of claim 1 wherein M is ammonium.

7. A dilute liquid detergent composition comprising:
A. about 0.01 vol % to about 50 vol % of a concentrated liquid detergent formulation comprising:
(a) about 25 wt % to about 50 wt % of a surface active agent comprising:
 (i) an anionic surfactant and
 (ii) a nonionic surfactant wherein the weight ratio of anionic:nonionic is 0:1 to 2:1;
(b) 0 wt % to about 10 wt % of a solvent selected from the group consisting of ethanol, isopropanol and mixtures thereof;
(c) a bicyclodecyl ether sulfonate hydrotrope of the formula:

$$M^{+m}\left[ {}^-O_3S - \text{(bicyclodecyl)} - O(AO)_nH \right]_m$$

wherein

AO is an alkyleneoxy selected from the group consisting of ethyleneoxy, propyleneoxy and mixtures thereof:

n is an integer averaging from 0 to 20; and

M is a cation selected from the group consisting of ammonium, sodium, potassium, calcium and magnesium; and m is 1 or 2 wherein the hydrotrope is an amount sufficient to give the liquid detergent a kinematic viscosity of from 100 to 250 cps @ 25° C., and B. water.

* * * * *